United States Patent
Adamczewski

[19]
[11] Patent Number: 5,934,181
[45] Date of Patent: Aug. 10, 1999

[54] COOKING UTENSIL COMPRISING A SENSOR FOR MEASURING THE TEMPERATURE OF THIS UTENSIL

[75] Inventor: David Adamczewski, Massingy, France

[73] Assignee: SEB S.A., Ecully, France

[21] Appl. No.: 09/236,269

[22] Filed: Jan. 22, 1999

[30] Foreign Application Priority Data

Jan. 23, 1998 [FR] France ................................ 98 00733

[51] Int. Cl.$^6$ .............................. A47J 27/00; G01K 1/02; G01K 1/14; G01K 7/08
[52] U.S. Cl. ................ 99/342; 99/422; 99/493; 374/141; 374/179; 374/180
[58] Field of Search .................. 99/342–344, 422–425, 99/493; 374/141, 149, 157, 179, 180, 208; 219/624, 627, 441, 442, 494, 523; 426/523, 231

[56] References Cited

U.S. PATENT DOCUMENTS

| | | | |
|---|---|---|---|
| 3,060,585 | 10/1962 | Kirk | ........................................... 99/342 |
| 3,405,678 | 10/1968 | Frenkel et al. | ........................... 374/141 |
| 3,701,344 | 10/1972 | Walls et al. | ............................ 99/342 X |
| 3,866,472 | 2/1975 | Witt | ....................................... 99/342 X |
| 3,950,632 | 4/1976 | Rivelli | ..................................... 219/523 |
| 4,340,610 | 7/1982 | Nioras | .................................... 99/342 X |
| 4,593,980 | 6/1986 | Schwartz | ............................ 374/179 X |
| 4,762,427 | 8/1988 | Hori et al. | .......................... 426/231 X |
| 4,805,188 | 2/1989 | Parker | ...................................... 374/141 |
| 5,441,344 | 8/1995 | Cook, III . | |
| 5,448,038 | 9/1995 | Kim | ......................................... 219/627 |
| 5,537,950 | 7/1996 | Ou-Yang | ............................... 99/342 X |
| 5,620,255 | 4/1997 | Cook, III | .................................. 374/141 |
| 5,720,555 | 2/1998 | Ilele | ..................................... 374/141 X |

FOREIGN PATENT DOCUMENTS

| 0 772 991 | 5/1997 | European Pat. Off. . |
|---|---|---|
| 03289916 | 12/1991 | Japan . |
| 06245858 | 9/1994 | Japan . |

*Primary Examiner*—Timothy F. Simone
*Attorney, Agent, or Firm*—Young & Thompson

[57] ABSTRACT

A sensor for measuring the temperature of the utensil is an infrared sensor arranged at a location of the utensil such that it can receive the infrared radiation emitted by the heating surface, the sensor being connected to an electronic circuit capable of converting the variation in the infrared radiation caused by the heating of the utensil into an electrical signal.

9 Claims, 2 Drawing Sheets

COOKING UTENSIL COMPRISING A SENSOR FOR MEASURING THE TEMPERATURE OF THIS UTENSIL

BACKGROUND OF THE INVENTION

1. Field of the invention

The present invention relates to a cooking utensil comprising a heating surface, a sensor for measuring the temperature of this surface and means for displaying this temperature.

The invention is intended for any cooking utensil comprising a heating surface heated by a heating source external to the utensil or built into it.

The invention is intended particularly, but not necessarily, for the following utensils: frying pans, saucepans, high-sided frying pans, cooking pots, meat grills, waffle irons, barbecues, raclette makers, pressure cookers, deep fryers and so forth.

2. Description of the prior art

In particular, a cooking utensil comprising a temperature display means built into the utensil handle is known from U.S. Pat. No. 5,441,344.

The temperature sensor is a thermocouple placed in the base of the utensil and connected to an electronic circuit and a temperature display screen built into the handle.

The problem with this cooking utensil is that the incorporation of the thermocouple in the base of the utensil is complicated and expensive. In addition, the electrical connections between the probe, the electronic circuit and the temperature display screen pose problems because of the moisture to which the utensil is exposed, especially during washing and repetitive thermal cycles.

The object of the present invention is to solve the problems of the aforesaid device.

SUMMARY OF THE INVENTION

The invention thus relates to a cooking utensil comprising a heating surface, a sensor for measuring the temperature of this surface and means for displaying this temperature wherein said sensor for measuring the temperature is an infrared sensor arranged at a location of the utensil such that it can receive the infrared radiation emitted by said heating surface, said sensor being connected to an electronic circuit capable of converting the variation in the infrared radiation caused by the heating of the utensil into an electrical signal.

This sensor senses directly, or after reflection, the infrared radiation emitted by the heating surface and requires no modification to the cooking utensil to build it into the latter.

The wavelength of the infrared radiation emitted by the heating surface varies as a function of temperature. All that is required therefore is to convert this variation in the wavelength into an electrical signal and to convert the latter into a value indicating the temperature.

Preferably, said infrared sensor is fixed to the handle of the utensil, particularly when the latter is a frying pan, a saucepan or the like.

Preferably also, the infrared sensor is placed in a closed housing projecting from the upward-oriented face of the handle.

This housing protects the sensor from the surrounding environment and in particular from water. The fact that it projects above the upward-oriented face of the handle enables it to be exposed to the infrared radiation emitted by the cooking surface.

In an advantageous version of the invention, said housing is fixed detachably to the handle of the utensil. It is thus possible to remove the housing before placing the utensil in a dishwasher.

Other features and advantages of the invention will also appear in the description which follows.

DETAILED DESCRIPTION OF THE PREFERRED EMBODIMENTS

Figure 1:
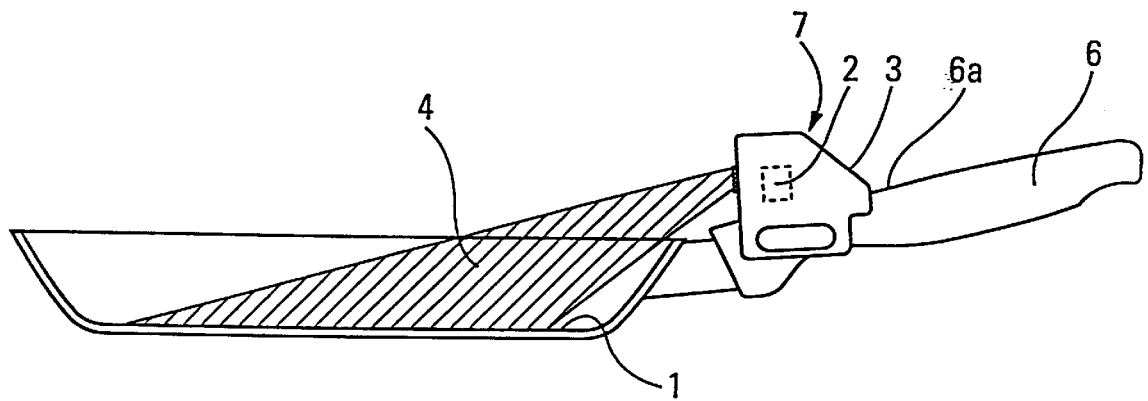
FIG. 1 is a sectional view of a frying pan fitted with a temperature sensor in accordance with the invention.

In the embodiment shown in FIG. 1, the cooking utensil, a frying pan, comprises a cooking surface 1, a sensor 2 for measuring the temperature of this surface 1, and means 3 for displaying this temperature.

In accordance with the invention, the sensor 2 for measuring the temperature is an infrared sensor arranged at a location of the utensil such that it can receive the infrared radiation 4 emitted by the cooking surface 1.

The infrared sensor 2 is connected (see FIG. 2) to an electronic circuit 5 capable of transforming the wavelength of the infrared radiation 4 into an electrical signal which is a function of the temperature.

In the example illustrated by FIG. 1, the infrared sensor 2 is fixed to the handle 6 of the utensil.

In addition, the infrared sensor 2 is placed in a closed housing 7 projecting above the upward-oriented face 6a of the handle 6.

Figure 2:
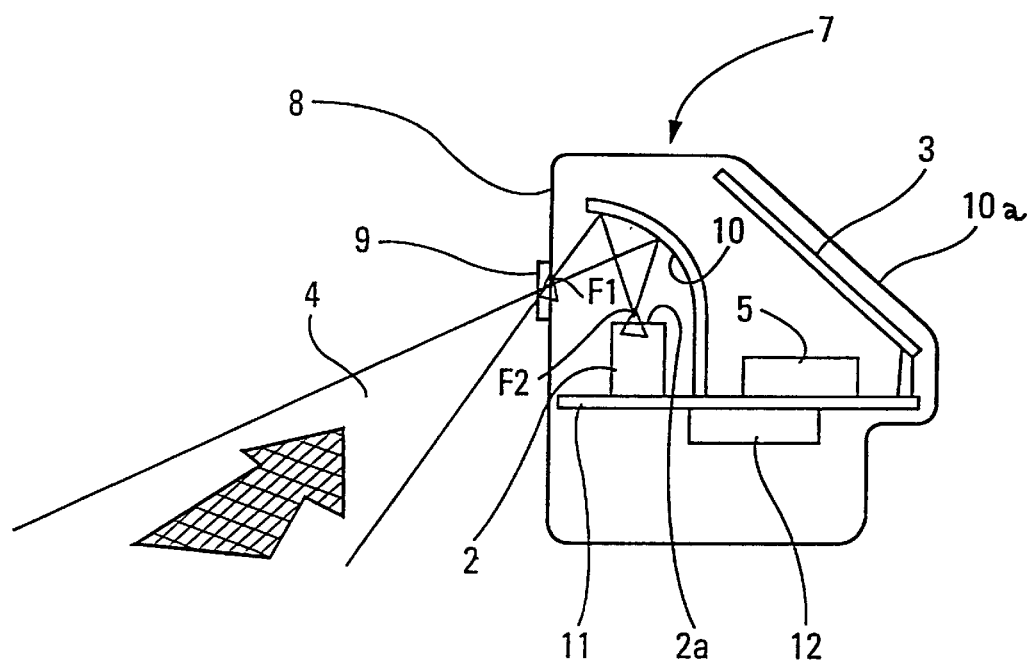
FIG. 2 is a sectional view of the housing containing the temperature sensor which senses the infrared radiation after reflection.

As indicated in FIG. 2, the housing 7 includes a face 8 oriented toward the cooking surface 1 and comprising a window 9 transparent to the infrared radiation 4. An elliptical reflective surface 10 is situated in the path of the infrared radiation 4 that has passed through the window 9. The latter is situated roughly on one $F_1$ of the foci of the elliptical reflective surface 10. The entrance face 2a of the infrared sensor 2 is situated on the other focus $F_2$ of the elliptical reflective surface 10.

It can also be seen in FIG. 2 that the housing 7 includes, on the opposite side from the face 8 oriented toward the cooking surface 1, a transparent face 10a behind which is a screen 3 for displaying the temperature.

In addition, the housing 7 contains a support 11 that carries the infrared sensor 2, the elliptical reflective surface 10, the electrical circuit 5 for converting the wavelength of the infrared radiation, the temperature display screen 3 and an electric battery 12 for powering said electronic circuit.

Figure 3:
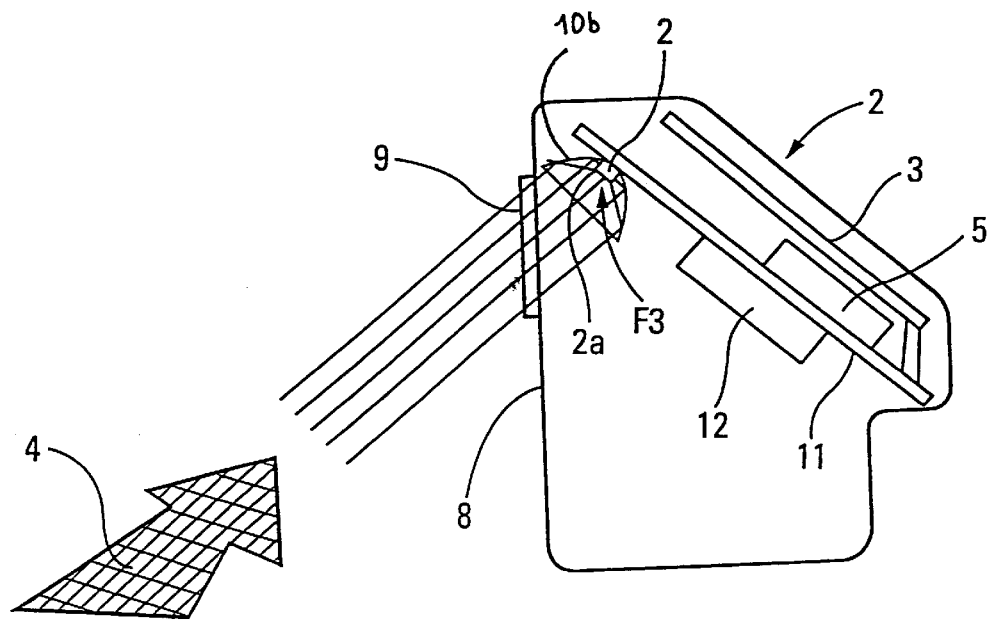
FIG. 3 is a sectional view of the housing containing the temperature sensor which senses the infrared radiation directly.

In the embodiment shown in FIG. 3, the housing 7 includes a face 8 oriented toward the cooking surface 1 and comprising a window 9 transparent to the infrared radiation 4, and a parabolic reflective surface 10b situated in the path of the infrared radiation 4 that has passed through the window 9.

The entrance face 2a of the infrared sensor 2 is situated on the focus $F_3$ of said parabolic surface 10b.

The parabolic surface 10b thus senses the infrared radiation directly and concentrates it on the sensor 2 situated on the focus $F_3$ of this parabolic surface 10b.

Figure 4:
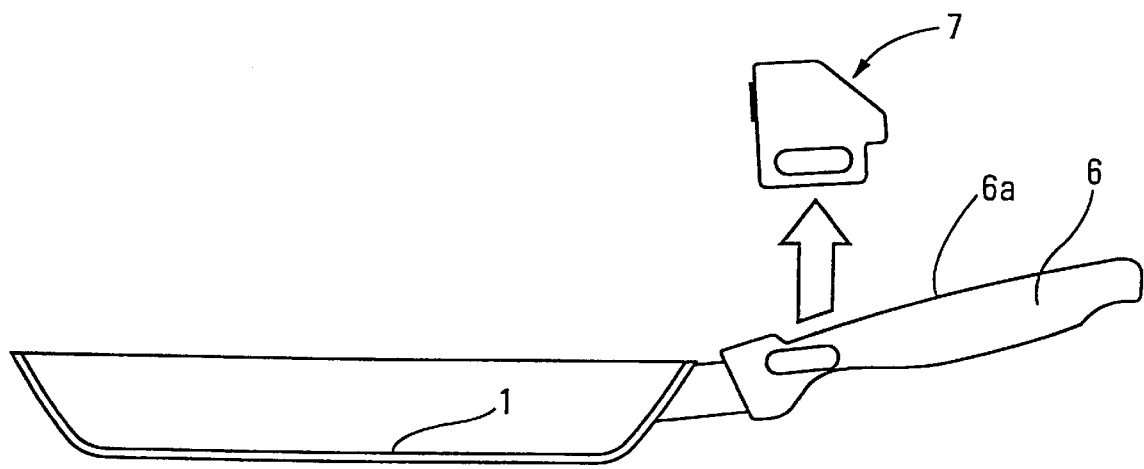
FIG. 4 is a view similar to FIG. 1 showing that the housing is detachable from the handle.

Preferably, said housing 7 (see FIG. 4) is fixed detachably to the handle 6 of the utensil, thus making it possible for the housing 7 to be removed before the frying pan is placed in a dishwasher.

From the above description it will be clear that the utensil according to the invention has the following main advantages:

- the temperature sensor requires neither any modification of the frying pan for its incorporation, nor electrical connections sensitive to moisture;
- the housing 7 protects the sensor and its electrical accessories from moisture and can be detached before washing to avoid any risk of damage;
- a single housing that can be adapted to a whole range of utensils.

If the cooking utensil comprises an electrical resistor for heating its heating surface, the sensor 2 can be connected to means for regulating the heating power of the electrical resistor in order to maintain the heating surface at an approximately constant temperature.

Such means are very familiar to those skilled in the art and do not need to be described or illustrated in the drawings.

Of course, the invention is not limited to the example of a cooking utensil as described, but can be applied to any utensil or cooking appliance having a heating surface, as indicated in the introduction of the present description.

There is claimed:

1. A cooking utensil comprising a heating surface, a sensor for measuring the temperature of this surface and means for displaying this temperature, wherein said sensor for measuring the temperature is an infrared sensor arranged at a location of the utensil such that it can receive the infrared radiation emitted by said heating surface, said sensor being connected to an electronic circuit capable of converting the variation in the infrared radiation caused by the heating of the utensil into an electrical signal.

2. A utensil as claimed in claim 1, wherein said infrared sensor is fixed to the handle of the utensil.

3. A utensil as claimed in claim 2, wherein the infrared sensor is placed in a closed housing projecting above the upward-oriented face of the handle.

4. A utensil as claimed in claim 3, wherein said housing includes a face oriented toward the cooking surface and comprising a window transparent to the infrared radiation, and an elliptical reflective surface situated in the path of the infrared radiation that has passed through said window, the latter being situated on one of the foci of said elliptical reflective surface and the entrance face of the infrared sensor being situated on the other focus of said elliptical reflective surface.

5. A utensil as claimed in claim 3, wherein said housing includes a face oriented toward the cooking surface and comprising a window transparent to the infrared radiation, and a parabolic reflective surface situated in the path of the infrared radiation that has passed through the windowthe entrance face of the infrared sensor being situated on the focus of said parabolic surface.

6. A utensil as claimed in claim 4, wherein housing includes, on the opposite side from said face oriented toward the cooking surface, a transparent face behind which is a screen for displaying the temperature.

7. A utensil as claimed in claim 6, wherein the housing contains the support that carries the infrared sensor, the reflective surface, -the electronic circuit for converting the variation in the infrared radiation, the temperature display screen and an electric battery for powering said electronic circuit.

8. A utensil as claimed in claim 3, wherein said housing is fixed detachably to the handle of the utensil.

9. A utensil as claimed in claim 1, comprising an electrical resistor for heating the heating surface, wherein said sensor is connected to means for regulating the heating power of the resistor and the temperature of the heating surface.

* * * * *